3,460,065
Patented Aug. 5, 1969

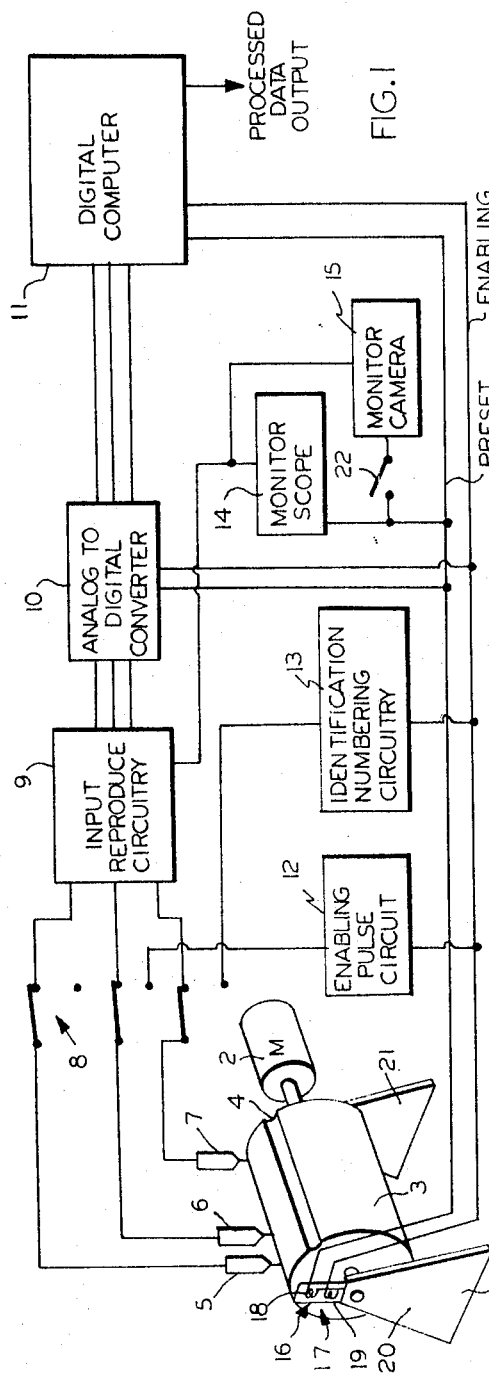
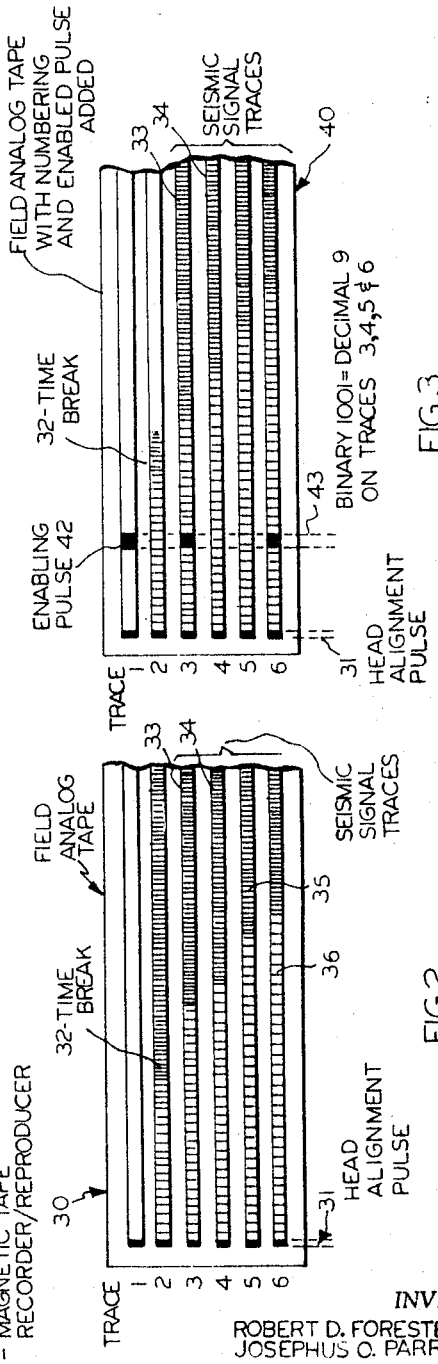

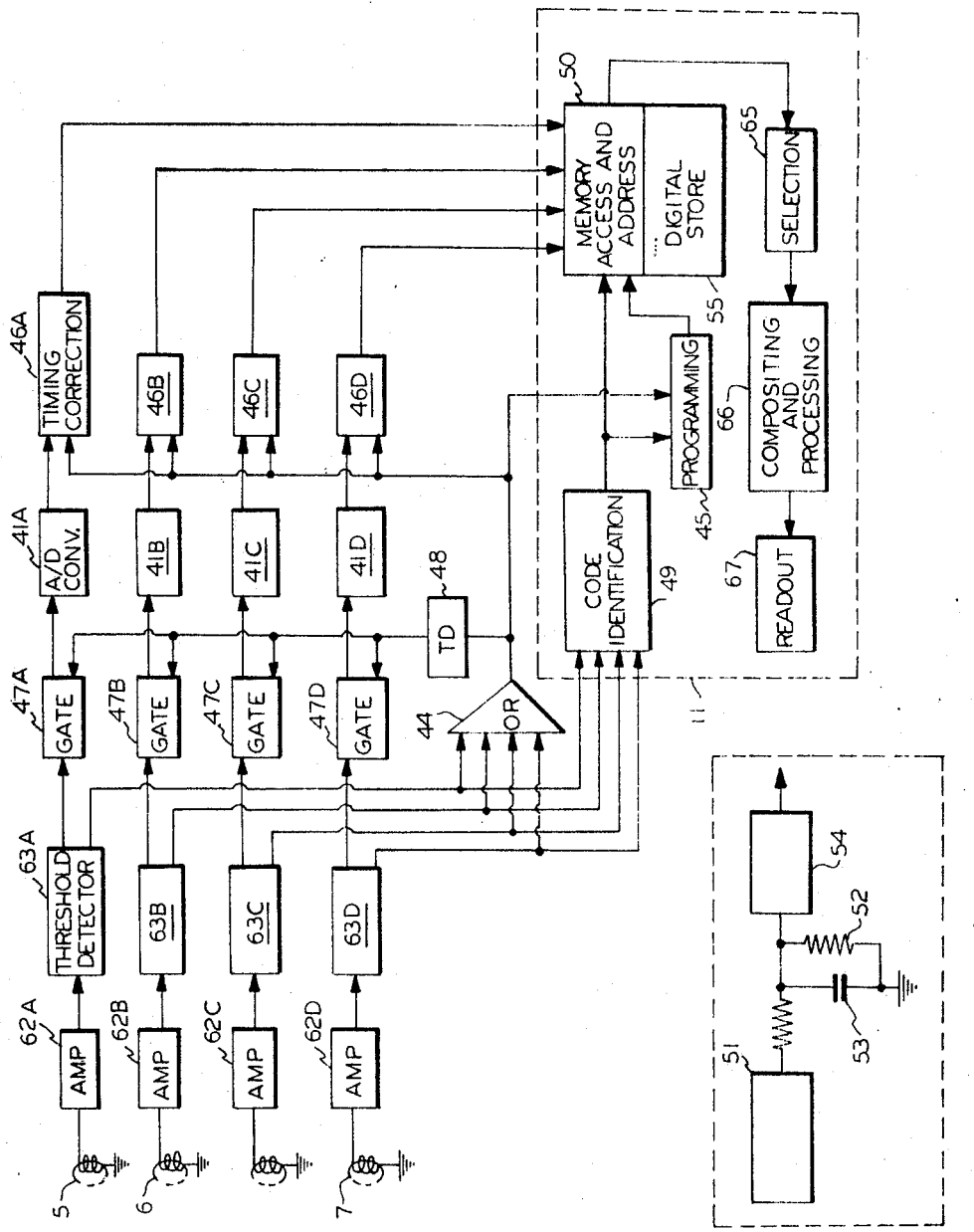

3,460,065
PROCESSING IDENTIFIED SEISMIC TAPE RECORDINGS
Robert D. Forester and Josephus O. Parr, Jr., San Antonio, Tex., assignors to Petty Geophysical Engineering Company, San Antonio, Tex., a corporation of Delaware
Filed Apr. 3, 1967, Ser. No. 627,931
Int. Cl. G01v 1/28
U.S. Cl. 340—15.5                            3 Claims

ABSTRACT OF THE DISCLOSURE

Seismic processing equipment and methods are disclosed to utilize special auxiliary signals recorded on multi-track analog seismic tape records in correction of timing relationships and selection of related seismic signals for compositing. The seismic signals are preferably converted to digital form, stored and selected by digital programming methods for combination into a composite record.

---

This invention relates to seismic prospecting and, more particularly, to methods and apparatus for analyzing seismic waves. The invention is especially concerned with improvements in the identification numbering of individual analog seismic recordings made in the field on magnetic tape and their subsequent processing in special equipment or a general purpose digital computer.

In seismic prospecting for valuable mineral deposits it is the long-established practice to set up on the surface of the earth a number of seismic detectors at spaced intervals, and to impact the earth, either with explosives or by mechanical means, so as to cause seismic waves to be propagated into the earth. Recordings are then made of those seismic waves which travel by various refraction and reflection paths from the source to the detectors where they are transduced into electrical signals. The recordings may be made in the form of oscillographic tracings on photographic paper so as to provide waveforms which are immediately usable but which cannot be reproduced readily and modified subsequently for optimum results. More generally, the seismic waves are recorded on magnetic tape or other media from which they can be reproduced and processed in various ways on either analog or digital equipment.

In routine prospecting it is not unusual to make several dozen such recordings of seismic waves during the course of one day's work on land. In marine prospecting, where operations are facilitated by the ease of transportation, several hundred recordings may be made each day. Obviously, some provision is required for properly identifying the many recordings which accumulate.

For conventional oscillographic recordings, the procedure for many years has been for the equipment operator to write the necessary information on the back of the recording. Later, the essential data is transferred to the printed information block on the front or face of the recording. In some instances purely sequential numbering of the recordings has been accomplished by a printing or photographic counter which is commonly provided on oscillographic cameras. Although somewhat slow, this manual identification numbering has been satisfactory in operations where the data is not subsequently processed by automatic or semi-automatic equipment.

For some years now the recording of seismic data on magnetic tape has also been a standard practice. Such recordings usually have been made in analog form in the field and analyzed later in central data-processing centers so as to produce corrected data which is finally assembled into display sections showing the sub-surface of the earth as a function of depth and horizontal position. For such analog field recordings, the identification number for each seismic tape, which is from three to twelve inches wide and several feet long, has been printed as a visible number of six or seven digits on the unused end or side of the recordings. Such numbers are preprinted at the time of manufacture; and when the tape is used for recording, the necessary related information is written on the protective dust jacket of the tape or in a separate report book, using the printed serial number as a reference. Any related data required in the data-processing operation is then extracted by the operating personnel from the dust jacket or report sheet listings.

While past processing of seismic field recordings has involved much manual preparation, the introduction of more nearly automatic equipment has been increasing recently. In particular, the use of digital computers has made possible approaches previously not possible. In some instances the seismic waves are recorded in digital manner in the field so as to be directly applicable as input to the digital computer. More usually, however, the field recordings have been made in analog form and digitized by the use of a converter at the central processing office. Thus, there exist vast numbers of analog type seismic tape recordings which must be converted whenever digital processing or review is required.

Where a computer is used, it must be triggered at the proper time for analysis of the seismic records. Conventionally this is done at the time break by using the recorded pulse which is generated at the time at which the seismic shot is fired for a computer enabling pulse. However, other initial singals or noises may accumulate and cause the computer to trigger at the wrong zero time, and conventional time breaks can be erroneously recorded to cause the computer to start processing at the wrong time. Such sources of noise can be generated by the analog heads coming into contact with the tape (so-called head rise) and from tape imperfections. The heads on seismic drums sometimes enter a depression at the end of the tapes and then rise with the curvature of the tape and eventually settle down to the tape on the drum cylinder, hence providing the term head rise. Furthermore, non-uniformity in time breaks can occur by radio interference if they are picked up over radio links or by poor timing of the shot itself, since variations of time occur between applying current to the cap and the actual shot where poor contact resistance is encountered in leads.

Also, if a computer processes an analog tape in wrong sequence, the results would be distorted without any apparent cause being indicated. Conventional processing of identification numbers in the field by manual processing into the computer is not only time consuming and costly but in addition leaves considerable chance for error.

It is very desirable that the identification of recording serial numbers and related parameters be made available directly on the tape as electrical input signals to be processed automatically by the digital computer. As will be described later, from such identification numbers in digital form it is possible to provide comparison and cross-checks, with previously programmed information in the computer, and to use certain of the numbering data as control signals for the processing of groups of recordings, so as to virtually eliminate errors due to use of wrong recordings and provide greater overall efficiency in data handling.

Our co-pending application, Ser. No. 482,159, filed Aug.

24, 1965, now Patent No. 3,339,175, for "Identification Numbering for Seismic Tape Recordings" relates to and illustrates means and methods for preparing seismic tapes with the appropriate identification data recorded thereon with the analog seismic signals including processing signals and digital identification numbers.

In this present invention, however, it is an object to provide improved means and methods for processing tapes having such processing signals.

Another object of the invention is to provide automatic processing means and methods for seismic recordings which serve to identify and relate automatically the recorded seismic data with respect to at least the time or the location of the seismic shots.

A further object of the invention is to provide for digital means and methods of processing and interpreting analog seismic records.

In this manner more accurate processing and interpretation may be afforded with critical analog seismic signal areas being accurately timed and identified without lengthy human processing where chances of error and misinterpretation are greater. The analog information on seismic tapes is identified by recorded coded digital words in order to make accurate selection of tapes with related seismic signals for combination into a composite signal. The processing is preferably done digitally after conversion of the analog seismic signals into digtal form whch can be stored in a memory and consulted in response to a program based upon the coded information for further selection of good records for combination into the composite seismic signal.

Further features, objects, and advantages of the invention will be found throughout the accompanying specification, wherein reference is made to the accompanying drawing, wherein:

FIGURE 1 is a schematic illustration in block diagram form of a seismic tape processing system;

FIGURE 2 is a portion of a typical multi-trace recording of seismic data with auxiliary signals;

FIGURE 3 is a further typical fragmentary recording having tape identification words thereon in digital form;

FIGURE 4 is a block diagram of a typical system embodying the invention; and

FIGURE 5 is a detailed diagram of a threshold detection arrangement.

Referring first to FIGURE 1 of the drawing, there is shown one preferred arrangement for recording identification numbers, on a seismic magnetic recording, and reproducing these numbers for input to a digital computer. Illustrated in schematic form, are magnetic tape recorder/reproducer 1, record/reproduce switch 8, input reproduce circuitry 9, analog-to-digital converter 10, digital computer 11, enabling pulse circuit 12, identification numbering circuitry 13, monitor oscilloscope 14, monitor camera 15, and camera switch 22. Also illustrated are motor 2, recording tape drum 3, recording gap 4, magnetic heads 5, 6, and 7, preset trigger tooth 16, enabling trigger tooth 17, preset trigger coil 18, enabling trigger coil 19 and mounting frames 20 and 21.

The digital computer may be any sort of conventional data processor which will identify, compare and sequence numbers, process seismic data to reference timing between pertinent events, and effect correlation and corrections to seismic data. For example, the computer should be able to take identification numbers from the seismic tapes and assure that such tapes are handled in proper sequence. Where the identification number contains corrective instructions, such as propagation velocity variations which are peculiar to certain locations, it should detect these and institute appropriate modified data processing routines. It should also be able to reference each trace and corresponding seismic head position with the time break and use the internal timing of such traces to correlate and otherwise process the seismic data for evaluation of pertinent reflections. Since such processing is well known and within the province of many known and available general purpose digital computers and since the computer itself is not a novel feature of the present invention, the computer is shown in the simplified block diagram form. In some cases the computer may be used to print a title corresponding to the serial number of the tape.

In operation, a field analog tape as illustrated in FIGURE 2, is wrapped around recording tape drum 3 with the leading edge positioned properly with respect to recording gap 4. It will be understood that synchronization means associated with motor 2 will insure that recording gap 4 always lands at the correct position when recording tape drum 3 at rest. As recording tape drum 3 rotates beneath the magnetic heads 5, 6, 7 data can be either recorded on or reproduced from the field analog tape, depending on the position of record/reproduce switch 8. When record/reproduce switch 8 is in the downward position, the enabling pulse circuit 12 and identification numbering circuitry 13 are connected to magnetic heads 6 and 7, respectively. The use of magnetic head 5 is reserved for reproducing only the timebreak signal, as will be discussed later.

Assume now that recording drum 3 is rotated so as to pass beneath magnetic heads 5, 6, and 7, preset trigger tooth 16 and enabling trigger tooth 17 rotate as part of the drum so as to pass beneath the preset trigger coil 18 and enabling trigger coil 19 respectively. Since these teeth are of magnetized material, an electrical pulse results when they are moved in proximity to the trigger coils. As preset trigger tooth 16 passes preset trigger coil 18, a trigger signal output results; this signal is not used in this stage of the numbering process. Next, the enabling pulse tooth 17 passes enabling trigger coil 19 so as to effect a trigger signal which actuates enabling pulse circuit 12 and identification numbering circuitry 13. As a result, magnetic head 6 is energized so as to record an enabling pulse on its track; also, magnetic head 7 is energized so as to record a binary number, either in the form of "on" or "off" on its track. In practice, as will be described later, the identification numbers actually will occupy a number of tracks and require use of a number of the available magnetic heads. Precautions also are taken to insure that seismic information already recorded is not erased or disturbed.

Next, the record/reproduce switch 8 may be placed in the upward position as shown to reproduce signals from the recorder/reproducer 1. The recorded signals will then pass to input reproduce circuitry 9 for amplification and modification. As recording drum 3 rotates, in the reproduce position, the preset pulse output from coil 18 serves to initiate turn-on of circuitry in analog-to-digital converter 10 and digital computer 11, and to start the sweep of monitor scope 14. As drum 3 continues to rotate, the enabling pulse output from coil 19 is applied to A/D converter 10 and digital computer 11 to initiate timing functions. Next, seismic data is reproduced in electrical form via magnetic heads 5, 6, and 7, passes through the input reproduce circuitry 9, A/D converter 10 and appears in digitized form at digital computer 11. This seismic wave information also is displayed on monitor scope 14, along with the enabling pulse, for observation by the equipment operator. A visual recording of the seismic information may be made at the same time on monitor camera 15 by closing camera switch 22 which is associated also with other camera synchronization circuitry.

Accordingly, the enabling pulse, as added prior to the time break at a precisely determined time in accordance with this invention, insures that the computer is not subject to triggering on noise at an erroneous time. This in part is due to the provision of a saturated tape, which overcomes any noise on the tape, and provides a step waveform with a duration of say six milliseconds so that five consecutive millisecond clock pulses may be sampled to indicate a computer coding pulse. This alerts the data processing equipment for receipt of the immediately following time break. Contrast this with the uncertainties produced by relying solely on the conventional timing from time breaks of various amplitudes and waveshapes spike-like in form similar to noise signals of high magnitude.

The above mentioned related application discloses means and methods for preparation of the tapes in the equivalent form shown in FIGURE 3. In this modified tape 40, it should be noted that head alignment pulse 31, enabling pulse 42, and numbering pulses 43 are in fixed relationship in time. The enabling pulse 42 always is recorded between alignment pulses 31 and time break pulses 32.

Identification numbers and enabling pulses on modified tape 40 are utilized in the following manner in the subsequent digital processing. Using the monitor recordings produced on oscillograph camera 15, the time interval between preset and enabling pulses is used for control operation of digital computer 11 (FIGURE 1).

When modified magnetic tapes 40 are introduced as input to digital computer 11 for processing, internal procedures and circuitry within the computer will compare the tape numbers with the numbers on the program card to see that the proper record is being reproduced. If the tape and program numbers do not correspond, the computer will either reject the particular tape recording or stop until correction is made. Also, the computer 11 will use the time interval between enabling pulse 42 and time break 32, as taken from the tape, to reference its internal timing to the time break. The identification numbering may also contain information as to the location of the prospect and the particular instrument spread which can be used in tilting the final data output. Additionally, certain parameters of the particular seismic spread could be included in the numbering so as to introduce corrective variables in the processing of the recording.

In FIGURE 4, the processing of seismic tapes of the type shown in FIGURE 3 is typified. For reference purposes the reading heads 5, 6, and 7 and the computer section 11 are shown with the same numerals as in FIGURE 1. It is understood that the number of seismic traces on a tape is purely illustrative and twenty-four traces on a record are not uncommon. Also, it is noted that the processing of these special tapes can be done to a large extent manually if the tracks are photographically recorded, but that the most efficient processing would be done automatically with magnetic record traces in a special electronic system where the elements of the block diagram are each well known in similar systems, but are not organized to achieve the objectives of this invention. On the other hand, many of the processing steps may be programmed in a general purpose electronic digital computer, and particularly those aspects shown within the confines of computer block 11, when the analog information upon the tapes is converted to digital form by means of analog-to-digital converters 41 in each processing channel A, B, C, D, etc., for the corresponding multiple seismic data tracks reproduced by heads 5, 6, 7, etc.

As each tape 40 (FIGURE 3) is linearly scanned from a start position on one end by means of a conventional rotary drum with corresponding control circuitry (not shown), the recorded digital head alignment pulses 31, the enabling pulse 42 along with the coded digital tape identification signals 43, and the time breaks 32 in the respective channels are presented in sequential order prior to the encountering of the pertinent recorded analog seismic signals 33, 34, etc. Signals from each track are suitably amplified at amplifier section 62 for presentation to means for detecting the digital signals for each track A, B, C, D, etc. on the tape, such as the threshold detectors 63. In this respect the digital signals are recorded at magnetic saturation for an extended fixed time duration so that they may be detected and separated from the analog signals except for the time break which is rarely recorded at saturation levels. For example, the apparatus shown in FIGURE 5 can effect this separation. Thus, only signals near saturation level are passed through biased amplifier 51 into the R-C timing network 52, which permits capacitor 53 to build up a potential sufficient to fire a Schmidt trigger circuit 54 when lasting the appropriate minimum time interval of the digital pulses, for example, the duration of the enabling pulses 42 which can be longer than that of the head alignment pulses 31.

Accordingly, the detected digital signals on any one track can serve to ready the processing system for analyzing recorded seismic traces in the various signal tracks by means of the OR circuit 44 which provides an output signal with a pulse appearing in any track. The processing is readied, for example, by means of a start connection with the programming section 45 in a computer 11.

These detected digital signals may further be used in timing correction stations 46 to give information related to moveout and other timing corrections, which are conventionally made in the processing of seismic recordings. As shown herein, there are certain advantages attained by timing the data in digital form after the seismic signals pass through analog-to-digital converters 41. Then the timing correction can be programmed for operation within the digital computer 11 to take into account much more complex and accurate processing than done in prior art analog processing. In addition, gates 47 are provided to permit exclusion of any data through the processing channels A, B, C, D, etc., until a time corresponding to the time break for example, as afforded by the operation of the time delay device 48. This prevents any erroneous data due to noises and assures then that as the case may be, either the initial time break or the predetermined time from the enabling pulse is used as the timing reference in the seismic signal processing.

Code identification station 49 may comprise well known data processing equipment for identifying each tape to be processed and accordingly to instruct either or both the programming section 45 and the memory address section 50 to appropriately channel the seismic data through the processing channels and the digital store 55. Should it be desired to at least partially manually process information in a sequential manner, the digital identification number can be used for selection of plated tapes from a store of tape records.

After related tapes are identified by the identification code numbers 43, good tracks are selected at station 65 and further processed at station 66 such as by adding or compositing, correlating and the like to provide an improved seismic signal representation at readout station 67, which might be the printer or tape deck of computer 11, example. It is clear that many different known signal processing steps may be programmed in computer 11 with the seismic data in digital form available from store 55 through the memory access and address section 50.

Having therefore identified novel signal processing means for producing improved seismic records and corresponding means for carrying out signal processing methods afforded by this invention, those features of novelty descriptive of the spirit and scope of this invention are set forth with particularity in the appended claims.

What is claimed is:

1. The method of processing seismic tapes having a plurality of analog seismic signal tracks thereon with a time break signal near the beginning of at least one track and a further digital signal in at least one of the tracks before the time break signal, comprising the steps of, scanning the seismic tapes linearly to reproduce the signals and pulses from the separate tracks in a plurality of electronic processing channels, detecting the presence of said digital pulse, and initiating transmission of the seismic signals on the tracks through said channels at a predetermined time established by receipt of said digital pulse on at least one of the tracks.

2. The method defined in claim 1, wherein the predetermined time is an interval selected to include in the transmission of the seismic signals on the tracks only information scanned subsequently from the instant of the time break signal.

3. The method defined in claim 1, further including the steps of converting said analog signals to digital form, processing the digital seismic signals to correct timing relationships between signals on the various tracks, and combining selected digital signals from a plurality of the tracks to produce a composite seismic signal.

References Cited

UNITED STATES PATENTS

| | | | |
|---|---|---|---|
| 3,252,148 | 5/1966 | Mitchell | 340—155 X |
| 3,333,247 | 7/1967 | Hadley et al. | 340—155 X |

RODNEY D. BENNETT, JR., Primary Examiner

D. C. KAUFMAN, Assistant Examiner

U.S. Cl. X.R.

340—174